United States Patent [19]

Cielo et al.

[11] Patent Number: 4,525,818
[45] Date of Patent: Jun. 25, 1985

[54] STABLE FIBER-OPTIC HYDROPHONE

[75] Inventors: Paolo G. Cielo; Garfield W. McMahon, both of Dartmouth, Canada

[73] Assignee: Minister of National Defence of Her Majesty's Canadian Government, Ottawa, Canada

[21] Appl. No.: 402,808

[22] Filed: Jul. 28, 1982

Related U.S. Application Data

[63] Continuation of Ser. No. 89,635, Oct. 29, 1979, abandoned.

[30] Foreign Application Priority Data

Aug. 9, 1979 [CA] Canada ................................. 333603

[51] Int. Cl.³ ............................................ H04B 13/00
[52] U.S. Cl. .................................... 367/149; 73/655; 350/96.15; 356/44
[58] Field of Search ............................ 367/141, 149; 350/96.15, 96.29; 356/44, 28.5; 73/655; 250/461 R

[56]  References Cited

U.S. PATENT DOCUMENTS

| | | | |
|---|---|---|---|
| 3,273,447 | 9/1966 | Frank | 367/149 |
| 3,488,124 | 1/1970 | Lambert et al. | 350/168 |
| 3,491,848 | 1/1970 | Giles | 367/154 |
| 4,115,753 | 9/1978 | Shajenko | 367/149 |
| 4,154,529 | 5/1979 | Dyatt | 356/28 |
| 4,162,397 | 7/1979 | Bucaro et al. | 367/149 |
| 4,193,130 | 3/1980 | Young et al. | 367/149 |
| 4,446,543 | 5/1984 | McLandrich et al. | 367/149 |

Primary Examiner—Harold J. Tudor
Attorney, Agent, or Firm—Cushman, Darby & Cushman

[57] ABSTRACT

An optical fiber hydrophone system in which a single optical fiber is used for all of the acoustical sensors in the system. A signal source and detector provides an optical signal in selected form, such as continuous or pulsed and detects and extracts an identifiable output signal. Each sensor is in the form of a sensing portion of the single optical fiber. Each sensing portion includes two optical reflectors separated one from another by a predetermined length of said optical fiber. Variations in acoustical pressure incident on the sensing portion causes a change in the predetermined length. This causes reflected portions of the optical signal to interfere with one another. Such interference is detectable for extraction of the identifiable output signal. In one form each sensing portion has two terminal branches of a mechanically deformable material, deformable in response to the fluctuations in acoustical pressure. Preferably, the optical fiber has two portions, a sensing portion thereof underwater and having a first optical cavity, and another portion thereof on board a vessel and having a second optical cavity, typically tunable with respect to the optical length thereof to maximize the interference in the detected optical signal.

17 Claims, 12 Drawing Figures

STABLE FIBER-OPTIC HYDROPHONE

This is a continuation of application Ser. No. 89,635 filed Oct. 29, 1979, now abandoned.

This invention relates to improvements in hydrophone systems generally. More particularly the invention relates to a hydrophone system that uses a single optical fiber as the signal conducting element.

BACKGROUND AND DESCRIPTION OF PRIOR ART

The concept of using optical fiber in a hydrophone system is not new. One such system proposed fairly recently has a number of potential advantages as compared to conventional accoustical detectors. A brief description of that system and some of its advantages will follow; for a more detailed description, the reader is referred to a paper by Messrs. J. A. Bucaro; H. D. Hardy and E. F. Carome appearing in the Journal of the Accoustical Society of America; 62, p. 1302, of 1977.

The system proposed in that paper consists of two optical fibers excited by two beams of coherent light. These beams are brought to interfere after transmission through a beam-splitter, some optical couplers and alignment tools. One fiber is immersed in a liquid insonified with acoustic waves. That fiber undergoes slight variations in both its refractive index and geometrical shape in response to local pressure within the liquid, i.e. in response to sound waves. Such variations cause phase modulation of the light beam conducted by the fiber. The phase modulated light beam interferes with a reference beam of light conducted by the second optical fiber which is kept at constant pressure. That interference results in an intensity modulation of the combined beam.

That system has definite advantages in its concept. However, very real practical problems arise when attempting to use it in an operational underwater acoustic detection system. One immediate problem is seen to derive from the extreme sensitivity of the alignment of optical elements to both displacement and relative orientation of the optical fiber, coupling, and decoupling elements. Relative mechanical vibrations, for example, should be kept below 0.1 $\mu$m of amplitude, i.e., $0.1 \times 10^{-6}$ meters. That is clearly difficult to achieve in the environment of a ship or sonobuoy floating on a wavy sea. Other problems arise in coping with the presence of a long portion or section of optical fiber which is subject to variable hydrostatic pressure conditions; to variations in the stress and drag forces induced by the water and movements of the ship; and so on. These factors can introduce noise into the system, causing interference with the modulation induced by the acoustical pressures (and changes therein) to be measured. To appreciate the potential impact of such sources of noise, note the following. Acoustical fluctuations of pressure in the portion of optical fiber near the surface due to surface waves are near 0.1 bar in magnitude. That is to be contrasted with the fluctuations in acoustical pressure to be measured which are in the range of $0.1 \times 10^{-6}$ bar.

The above problems have remained important and have not been resolved in this art. Further evidence of this and of the relative complexities of hydrophone systems proposed recently, using optical fibers, is seen in U.S. Pat. No. 4,115,753 which issued Sept. 19, 1978 to the U.S. Department of the Navy. Thus, areas of difficulty have continued to exist in the design and implementation of optical fiber hydrophone systems.

BRIEF SUMMARY OF THIS INVENTION

This invention incorporates a number of improvements and advantages over prior art systems. Most notably, the optical fiber hydrophone system embodying this invention consists of a single optical fiber into which there is built one or more sensing portions each of which is deformable in response to variations in acoustical pressure incident thereon. This deformation phase modulates the portion of the light beam reflected back and forth between the reflectors situated at both ends of the sensing portion, and enables extraction of an identifiable output signal from the intensity modulated signal detected at the end of the optical fiber. In other words, according to this invention the mixing of interfering light beams, i.e., optical signals, is carried out in the same region or zone where the acoustical pressure or variation therein is to be probed. This has the advantage that any mechanical vibration and effects thereof between discrete optical elements is avoided. Moreover, variations in the stress and drag forces induced by the water and ship movements on the rear-sensing portion of the fiber do not affect the signal. Finally, the present invention permits implementation of a multiplexing system for a line array using only a single optical fiber, a single optical source and a single detector for the entire array.

Accordingly, there is provided by one aspect of this invention an optical fiber hydrophone system adapted to process variations in local acoustical pressure and provide an identifiable output signal, comprising signal source and detecting means for providing an optical signal in a selected form, and for detecting and extracting the identifiable signal, a signle optical fiber connected at one end to the source and detecting means and operable for conducting optical signals, and a sensing portion provided in the optical fiber remote from the source and detecting means, the sensing portion including two optical reflector means incorporated into the fiber and spaced one from the other by a predetermined length of the optical fiber, the variations in acoustical pressure incident on the sensing portion causing a change in the predetermined length thereof and thus a phase modulation in portions of the optical signal detected, whereby the intensity modulated optical signal is susceptible to processing for extraction therefrom of the identifiable output signal.

In a preferred embodiment of the invention, the single optical fiber includes two sections, a first section, in use, being disposable underwater with the sensing portion defining a first optical cavity, the second section of the optical fiber typically being located aboard a vessel, and including a second optical cavity therein delimited by optical reflector means, the first and second optical cavities having lengths of the optical fiber therein that are in predetermined relation to one another, whereby the variations in acoustical pressure cause proportional variations in the predetermined length of the sensing portion on which it is incident, this causing intensity modulation of the detected signal and enabling the detector means to extract the identifiable output signal from the intensity modulations.

In a more preferred embodiment, the second optical cavity comprises a length of the single optical fiber wound about a piezoelectric element, and wherein a servo-control circuit is provided for applying the tuning voltage to the piezoelectric element, whereby variations made to the tuning voltage to maintain the cavities tuned, correspond to the modulations in the detected signal caused by variations in the length of the first optical cavity, as created by the variations in acoustical pressure incident thereon, the variations to the tuning voltage providing the identifiable output signal.

These features and other advantages of the present invention will become more apparent from the detailed description below. Such description should be read in conjunction with the accompanying drawings.

DESCRIPTION OF THE PREFERRED EMBODIMENTS

Figure 1:
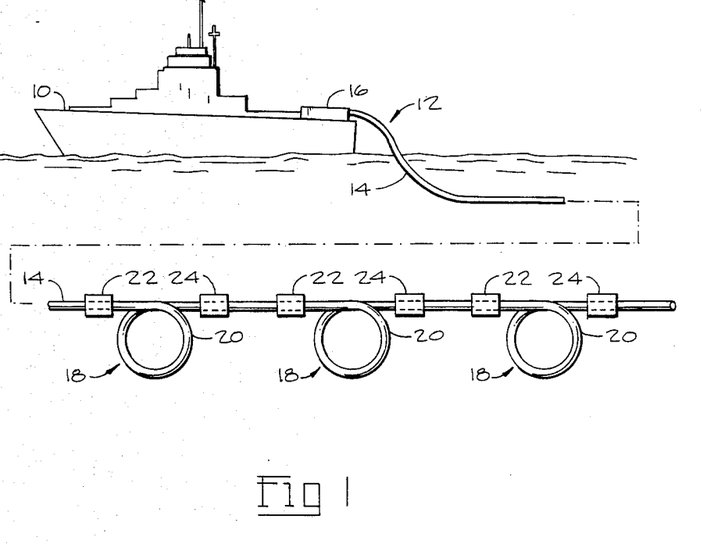
FIG. 1 is an elevation view showing schematically one application of the present invention.
Figure 2:
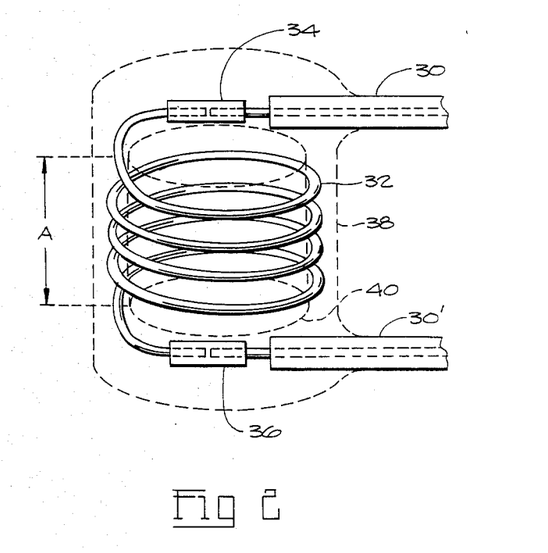
FIG. 2 is an elevation view showing schematically one practical form which a sensing portion of the present hydrophone system can take.

Turning now to the drawings, FIG. 1 shows one application of the present invention. Here a vessel 10, typically a naval vessel, is shown trailing a hydrophone system 12. This system 12 includes a single optical fiber 14, connected at one end to a source and detecting means 16 for optical signals. Said means are known per se in this art. The optical fiber 14 is provided with at least one, and usually several sensing portions 18 located along the fiber 14 remote from source and detecting means 16. The sensing portions 18 are spaced equally apart and are incorporated into the optical fiber 14 as a predetermined length thereof. The optical fiber 14 functions to transmit or conduct an optical signal of a selected form from the source and detecting means 16 to the sensing portions 18, and a reflected optical signal back. This optical signal is in selected form inasmuch as it may be a continuous or pulsed optical signal derived from a laser, or incoherent light source. The optical fiber 14 is typically about 100 microns in diameter, with a light conducting core of about 5 microns diameter. Moreover, a commercially available optical cable typically 2–3 mm in diameter, as shown in FIG. 2 is used to protect the fiber against stress during manipulation and towing. FIG. 1 illustrates the sensing portions 18 as being of a generally circular coil-like configuration. Other geometrical forms are also possible as will be evident below, leading in those instances to particular effects, such as increased sensitivity. Thus, sensing portion 18 shown in FIG. 1 represents an elementary form of sensor.

In any event, each sensing portion 18 comprises a loop or coil 20 of the optical fiber 14, with two optical reflectors 22 and 24 incorporated therein. The reflectors 22 and 24 are separated by a predetermined length of the optical fiber 14. The optical reflector 22, the one, say, closest to the source and detecting means 16, must be partially reflective. Reflector 24 can be either partially reflective or totally reflective. In operation, underwater signals and noise are in the form of waves pulses or the like which represent variations in local acoustical pressure. When these variations in acoustical pressure are incident on sensing portions 18, the predetermined length of optical fiber 14 therein is caused to change. This change in length is microscopic and occurs due to the strain imposed on the coil of optical fiber by the pressure variations representing the acoustic signal sensed. The pressure sensitivity of an optical fiber is strongly dependent on the strain configuration induced in such fiber by acoustical pressures. Thus, we have found that increases in the pressure sensitivity by two orders of magnitude over that of a simple fiber coil of given length are possible. This will be considered further below.

Returning to FIG. 1, the partial reflector 22 takes one of a variety of configurations known in this art. It could, for example, take the form of a microscopic taper introduced mechanically; a periodic disturbance generated by exposing a portion of the fiber 14 to an optical standing wave pattern; or some discontinuity in the fiber core. Such a discontinuity may be obtained, for example, by localized ion bombardment, or from a low quality fiber connector whose reflectivity depends on the eventual misalignment of the two ends and on the refractive index of the matching liquid.

FIG. 2 shows one practical implementation of the sensing portion 18. Here, two sections of optical fiber cable 30 and 30' are interconnected by another portion of optical fiber 32 of a predetermined length. The optical fiber cables 30 and 30' connect with the surface and/or the next hydrophone in the array. Commercially available optical fiber couplers 34 and 36 join the ends of the optical fiber in cables 30,30', and fiber 32, together. Fiber 32 is embedded in the walls of a cylinder 38 that has an internal, air-filled cavity 40. This configuration provides a much higher sensitivity than the conventional sensor configuration where the pressure variations are applied directly to the fiber, as will be seen shortly.

The above design leads to longitudinal compression of the fiber, rather than isotropic compression. The latter is to be avoided since it is relatively inefficient in terms of total phase shift obtained for a given pressure differential.

In FIG. 2, the cylinder 38 has an air-filled cavity 40. As a variant to that, a section of the optical fiber is cemented to, or incorporated into, a material having a low value of Young's Modulus. Hence, due to the small cross-section, the fibers' length is reduced in response to longitudinal compression of the compliant material. Looping or "folding" the optical fiber back and forth through the compliant material multiplies the sensitivity. Further yet, if the surrounding material has a compliance much lower longitudinally as compared to transversely, a predominately transverse strain is derived. As suggested above, this is preferable to isotropic strain. Fibers of boron, or graphite, can be made with this kind of anisotropic compliance.

In FIG. 2 a single fiber optical cavity is formed between reflectors 34 and 36. Moreover, that optical cavity is positioned remote from the source and detecting means 16.

Figure 3A:
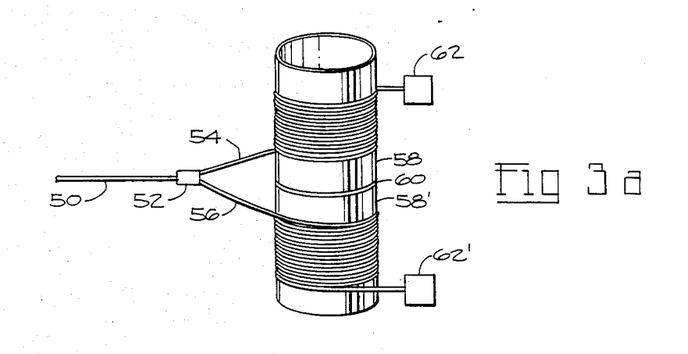
FIGS. 3a, 3b and 3c are also elevation views, showing schematically other forms of sensing portions used in another embodiment of a hydrophone system envisaged herein.
Figure 3B:
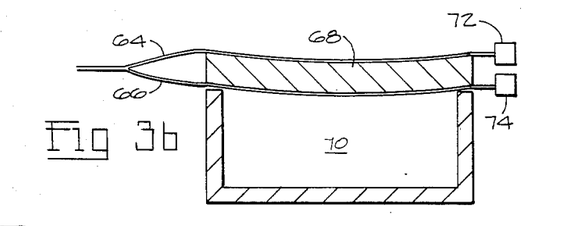
Figure 3C:
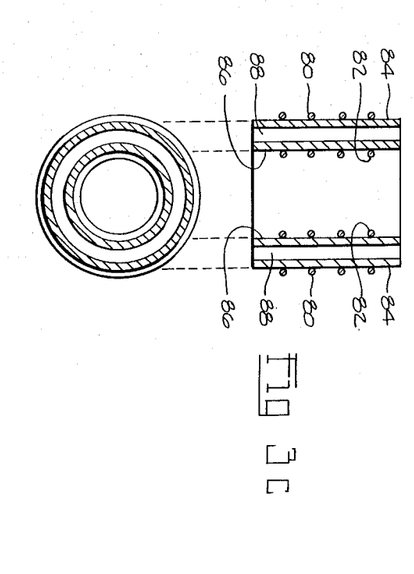

In FIGS. 3a, 3b, and 3c, the single fiber cavity of FIG. 2 is replaced by a double fiber cavity for which the designs shown here are examples only. In these designs, the coherence requirements for the light from which the source signal is derived are greatly relaxed. Thus, in FIG. 3a, for instance, a light beam from a source is conducted by a single optical fiber 50 and is split or coupled at 52 into two terminal branches 54 and 56. These branches 54 and 56 of optical fiber are again of a predetermined length. They are each wound around respective cylinders 58 and 58' having a common base plane 60. The cylinders 58, 58' are typically about 5 cm in diameter, and from 5–10 cm in height. Further, the cylinders 58,58' are made of materials having different compliances. Alternatively, one may be filled with air and the other open to water or filled with a rigid material. Each branch 54 and 56 terminates at a total reflector 62 and 62'.

In FIG. 3b, two terminal branches 64 and 66 of optical fiber are coupled together and cemented on the two sides of a deformable plate 68. It can be shown that this configuration is very sensitive to the curvature of plate 68. Thus, bending is induced either by an air-filled cavity 70 on one side of the plate 68, or, by using a plate made of two slices of materials with different compliances bonded together. Again, the branches 64 and 66 are of a predetermined length, and terminate at total reflectors 72, 74.

As yet another variation, FIG. 3c shows a system in which two terminal branches 80,82 of optical fiber are embedded in, or bonded to, the walls of outer and inner cylinders 84,86 having an air-filled cavity 88 between.

In yet another configuration not illustrated herein, the two terminal branches of optical fiber are wound or coiled around two perpendicular axes of an anisotropic material.

In each of the configurations just described, a light beam is split or coupled into the two terminal branches of the optical fiber. The portion of light travelling in each branch is totally reflectd back at the terminal reflector on each branch. The reflected beams recombine in the main fiber at the point of coupling/decoupling with a phase difference that depends on the geometries and properties of the two branches of fiber. If, for example, the branches are of the same length, but have different compressibility properties, they will introduce different phase variations to the reflected optical beams when the branches are subject to variations in acoustical pressure. This results in an intensity modulation of the recombined beam formed by superpositioning of the two reflected beams.

It was mentioned above that the pressure sensitivity of an optical fiber is strongly dependent upon the strain configuration induced in the fiber by accoustical pressure. To pursue that further, when a stress configuration with orthogonal components $T_1$, $T_2$, and $T_3$ exists in an isotropic elastic solid, and shear stresses are negligible, then the resulting strain components are given by:

$$S_1 = E^{-1}[T_1 - \sigma(T_2+T_3)]$$
$$S_2 = E^{-1}[T_2 - \sigma(T_1+T_3)] \quad (1)$$
$$S_3 = E^{-1}[T_3 - \sigma(T_1+T_2)]$$

where E and $\sigma$ are Young's Modulus and Poisson's ration, respectively, in the solid.

The following expression represents the phase shift $\Delta\phi$ of a light wave travelling in an optical fiber that is subjected to longitudinal strain $S_1$, and transverse strains $S_2$ and $S_3$;

$$\Delta\phi = k_o n L S_1 - \tfrac{1}{2} n^3 k_o L (S_1 p_{12} + S_2 p_{11} + S_2 p_{12}) \quad (2)$$

where
L is the fiber length
$k_o$ is the optical wave number
n is the refractive index, and
$p_{ij}$ are the photoelastic strain constants.

Equations (1) and (2) above permit the computation of phase shift in the optical fiber when the stress configuration is known. Because sensitivity is directly related to the phase shift, the relative sensitivities of various hydrophone designs can be compared.

A. Simple Fiber Coil—The sensor configuration most often described in the literature consists of a fiber coil in direct contact with the acoustic medium. At low frequencies, where the coil dimensions are small in comparison to the acoustic wavelength, the instantaneous pressure can be considered constant across the sensor. The stress configuration in the fiber is uniform three-dimensional, which has a particularly low sensitivity compared to other configurations.

Uniform stress due to an instantaneous acoustic pressure P results in uniform strain components:

$$S_1 = S_2 = S_3 = PE^{-1}(1-2\sigma). \quad (3)$$

Substituting these values into Eq. (2), the following expression is obtained for the sensitivity of a simple fiber coil immersed in the acoustic medium:

$$\left(\frac{\Delta\phi}{P}\right)_U = \frac{k_o n}{E} L(1-2\sigma)\left[1 - \frac{n^2}{2}(2p_{12}+p_{11})\right] \quad (4)$$

B. Jacketed Fiber Coil—Consider an optical fiber of radius r with a homogeneous jacket of radius R subjected to an instantaneous acoustic pressure P. End effects are neglected in a long fiber and the longitudinal strain $S_1$ must be the same in both jacket and fiber. A small element of length can be considered cylindrical and the following expressions can be written for the stresses in the two materials:

$$T_1 = 2\sigma P + S_1 E \quad (5)$$
$$T_1' = 2\sigma' P + S_1 E$$
$$T_2 = T_2' = T_3 = T_3' = P \quad (6)$$

where the primed quantities apply to the jacket material and the unprimed quantities to the fiber.

Longitudinal force due to the pressure P must be supported by longitudinal stresses in the fiber and jacket:

$$\pi R^2 P = T_1 \pi r^2 + T_1' \pi (R^2 - r^2). \tag{7}$$

Combining Eqs. (5) and (7) we obtain $$S_1 = P \frac{(1 - 2\sigma')R^2 + 2(\sigma' - \sigma)r^2}{E'(R^2 - r^2) + Er^2}. \tag{8}$$

From Eqs. (1), (5) and (6):

$$S_2 = S_3 = PE^{-1}(1 - \sigma - 2\sigma^2) - S_1\sigma. \tag{9}$$

Substituting these strain values into Eq. (2), the sensitivity for a jacketed optical fiber coil is obtained as $$\left(\frac{\Delta\phi}{P}\right)_J = k_0 n L \left\{ \left[ 1 - \frac{n^2}{2}(p_{12} - p_{11}\sigma - p_{12}\sigma) \right] \times \left[ \frac{R^2(1 - 2\sigma') + 2r^2(\sigma' - \sigma)}{E'(R^2 - r^2) + Er^2} \right] - \frac{n^2}{2}(p_{11} + p_{12}) \frac{1 - \sigma - 2\sigma^2}{E} \right\}. \tag{10}$$

The phase sensitivity was calculated from Eq. (10) for two different jacket materials, Lucite and polyethylene. The relative sensitivities compared to a simple fiber coil are plotted in FIG. 4 as functions of the jacket radius R. The fiber radius is taken as 20 μm and the properties of the fiber material are assumed to be those of fused silica: $E = 73$ GPa, $\sigma = 0.17$, $p_{11} = 0.12$, $p_{12} = 0.27$. The elastic properties of the jacket materials are: for Lucite, $E' = 4$ GPa, $\sigma' = 0.4$ and for polyethylene, $E' = 0.76$ GPa, $\sigma' = 0.458$.

C. Fiber Coil on an End-Capped Hollow Cylinder—A length of optical fiber can be bonded to or embedded in an end-capped hollow cylinder of some elastic material so that the longitudinal strain in the fiber is essentially equal to the tangential strain in the cylinder, i.e. $S_1 = S_\phi$.

Radial, axial and tangential stresses in an end-capped hollow cylinder subjected to an external pressure P are given by:

$$T_\rho = P\left[\frac{b^2}{b^2 - a^2} - \frac{b^2 a^2}{\rho^2(b^2 - a^2)}\right] \tag{11}$$

$$T_z = P\frac{b^2}{b^2 - a^2}$$

$$T_\phi = P\left[\frac{b^2}{b^2 - a^2} + \frac{b^2 a^2}{\rho^2(b^2 - a^2)}\right]$$

where $\rho$, z and $\phi$ are cylindrical coordinates, and b and a are the outer and inner radii of the cylinder.

It is assumed that the proportion of fiber material to cylinder material is very small, so that stresses in the cylinder are essentially unaffected by the presence of the fiber. The transverse stresses in the fiber will therefore be approximately equal to the radial and axial stresses in the cylinder. In the two previous configurations no distinction was made between the stresses $T_2$ and $T_3$ in the fiber since they were equal. In the present case two limiting situations arise: (a) when $T_2 = T_\rho$ and $T_3 = T_z$ or (b) when $T_2 = T_z$ and $T_3 = T_\rho$. The correct values of $T_2$ and $T_3$ depend on the direction of polarization of the light wave. While the two polarization modes are usually coupled for fiber lengths of the order of 1 m or more, they may be uncoupled in the presence of anisotropic transverse strains, such as in this case. Even if the two modes are uncoupled, however, both will be excited unless the initial polarization is carefully selected. We shall assume here that both polarization modes are equally excited, so that an average of $p_{11}$ and $p_{12}$ will be used as the photoelastic strain constants associated with $S_2$ and $S_3$ in eq. (2): $P_{av} = (p_{11} + p_{12})/2$. Only slightly different results will be obtained if only one mode is excited.

For simplicity it is assumed that the fiber is located at or near the outer radius of the cylinder, i.e., $\rho = b$. Using Eqs. (1) and (11), the transverse strain in the fiber can now be expressed as $$S_2 + S_3 = P\left[\frac{2b^2 - a^2}{b^2 - a^2}\left(\frac{1 - \sigma - 2\sigma^2}{E} + \frac{2\sigma\sigma'}{E'}\right) - \frac{2\sigma}{E'}\frac{b^2 + a^2}{b^2 - a^2}\right] \tag{12}$$

Also, since $S_1 = S_\phi$:

$$S_1 = P\left[\frac{b^2 + a^2}{E'(b^2 - a^2)} - \frac{\sigma'}{E'}\frac{2b^2 - a^2}{b^2 - a^2}\right] \tag{13}$$

Finally, substituting Eqs. (12) and (13) into Eq. (2) an expression for the sensitivity of an optical fiber coil on an end-capped cylinder is obtained as:

$$\left(\frac{\Delta\phi}{P}\right)_C = \frac{k_0 n L}{E'(b^2 - a^2)}\left\{[b^2 + a^2 - \sigma'(2b^2 - a^2)]\left[1 - \frac{n^2 p_{12}}{2}\right] - \frac{n^2 p_{av}}{2}\left[(2b^2 - a^2)\left(\frac{1 - \sigma - 2\sigma^2}{E/E'} + 2\sigma\sigma'\right) - 2\sigma(b^2 + a^2)\right]\right\}. \tag{14}$$

The phase sensitivity of a fiber coiled on an end-capped hollow cylinder was calculated from Eq. (14) for three cylinder materials, polyethylene, Lucite and aluminum. The relative sensitivities compared to a simple fiber coil are plotted in FIG. 5 as functions of the radius-to-wall thickness ratio of the cylinder, $b/b - a$. Young's Modulus and Poisson's ratio of the aluminum are taken as $E' = 71$ GPa, $\sigma = 0.335$.

Figure 4:
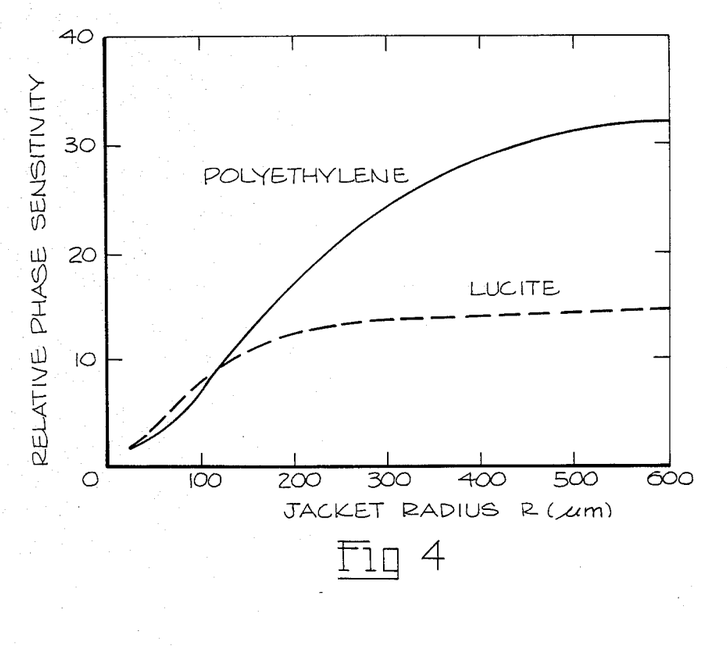
FIGS. 4 and 5 are graphical representations to show the relative phase sensitivities of three different sensor configurations as a function of jacket radius R (in FIG. 4) and as a function of radius-to-wall thickness ratio (in FIG. 5)
Figure 5:
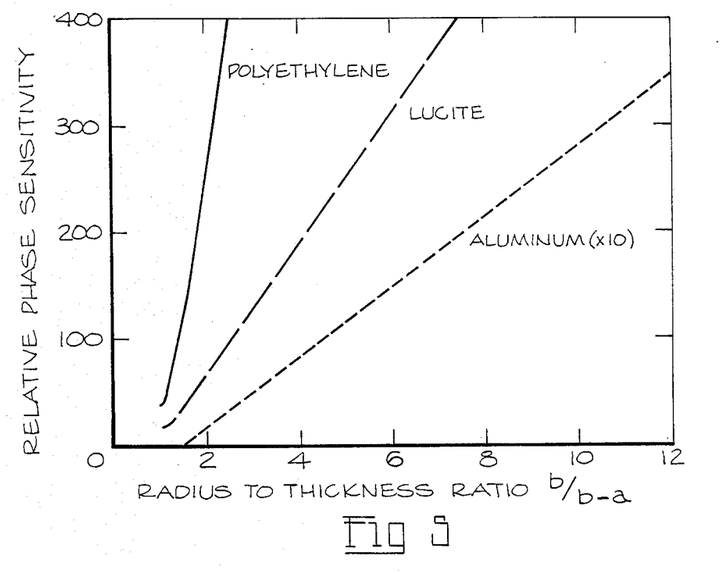

The results plotted in FIGS. (4) and (5) show that the phase sensitivity of a fiber optic hydrophone based on a simple fiber coil may be increased an order of magnitude by using a suitable fiber jacket and two orders of magnitude by coiling the fiber on a hollow end-capped cylinder of a suitable material.

It is recognized from the foregoing that the reflected beams of light will interfere with one another. Such interference occurs in an identifiable manner, and upon detection enables the extraction of an identifiable signal. The properties of that signal are dependent, for example, on the variations in acoustical pressure incident on the sensor portions and particularly on the sensor configuration and characteristics. With the arrangement of sensors 18 in FIG. 1, the interfering reflected beams are delayed by double the optical length, i.e., double the length of the optical cavity between reflectors 22 and 24. Thus, the coherence length of the light source must be much longer than the optical length if the beams are to interfere coherently. One way to minimize that requirement is to introduce the beam of light into an optical cavity of the same length as in the remote sensor portion 18, before transmitting it through the optical fiber. This introduces a peak into the autocorrelation function of the light wave at the distance 2×(length of optical cavity). The light beam will therefore interfere coherently with itself when delayed twice the optical length. In other words, the first optical cavity will introduce a spectral modulation whose modes will be exactly matched by the modes of the second modulation provided the two cavities are of equal length.

Note, however, that matching of the two cavity lengths is not critical if a laser source is used for the beam of light. The important aspect is that the difference in length of the two optical cavities must be small relative to the coherence length of the original source.

In one form, the first cavity is provided by a two-beam interferometer. A better choice is to use an etalon, i.e., a fiber cavity. As above described, such an etalon is delimited by two partial reflectors similar to that indicated at 22 of FIG. 1. In operation, the light beam undergoes a number of multiple reflections between the two reflectors. As a result, a number of equispaced modes will appear in the spectrum of the transmitted light, those modes matching with the modes of the second cavity at the end of the fiber, providing the two cavities are of equal length. The light beam which is transmitted through the two cavities is intensity-modualted by acoustical fluctuations on the sensor portion(s) 18, and returned to the surface for detection in source and detecting means 16.

Another interesting aspect of the double-cavity configuration arises from the possibility of recovering the signal by "locking" the optical length of the first cavity to that of the second cavity. Thus, turning to FIG. 6, a hydrophone system embodying this invention is shown overall at 100. That system 100 includes a surface portion 102, and a submerged portion 104 normally located underwater, remote from a vessel or ship on which portion 102 is carried. Surface portion 102 includes, inter alia, a laser or light emitting source 106 which coacts with a conventional detector (e.g. a silicon detector) to form a source and detecting means for present purposes. An optical fiber coupler 110 enables light from the laser source 106 to be coupled into a single optical fiber 112. Note that the vertical spacing between the outgoing "run" and incoming "run" of the fiber 112 is greatly exaggerated. These "runs" are usually incorporated into a single optical fiber cable, as is commercially available. In accordance with the preferred embodiment of this invention, surface portion 102 is provided with partial reflectors 114 and 116 which are separated by a predetermined length 118 of the fiber 112. Further, part of that predetermined length 118 is coiled around a piezoelectric cylinder 120. By applying a small voltage across the cylinder 120, one can vary (microscopically of course) the length of the first optical cavity, i.e., can vary the predetermined length 118 of optical fiber.

The submerged portion 104 is also provided with a pair of partial reflectors 122, 124 in the single optical fiber 112. These reflectors 122, 124 are also spaced apart a set distance 126 in fiber 112 to define a second optical cavity. This second cavity functions as the sensor means described at 18 in FIG. 1. As there described, variations in acoustical pressures incident on the length 126 of optical fiber 112 cause a microscopic change in its length. In the case of intensity-modulation detection, this change in length causes a proportional variation of the signal detected by the detector, if the phase variation is much small than $2\pi$.

Figure 6:
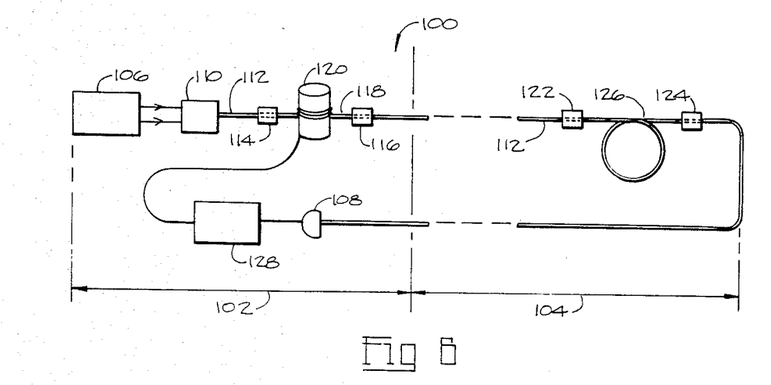
FIG. 6 is a sketch showing schematically a preferred configuration for a hydrophone system encompassed by this invention.

As shown in FIG. 6, it is preferable to provide a servo-control circuit indicated at 128 in the surface portion 102. Control circuit 128 supplies a variable voltage to piezoelectric cylinder 120. That enables the length of the first optical cavity, i.e., length 118 of fiber to be tuned or matched to the length 126 of the second optical cavity. The variations in control voltage correspond to the variations in optical length, i.e., the variations in acoustical pressure, of the second cavity. This control voltage and changes therein then form the identifiable signal which is recovered, i.e., extracted.

Figure 6A:
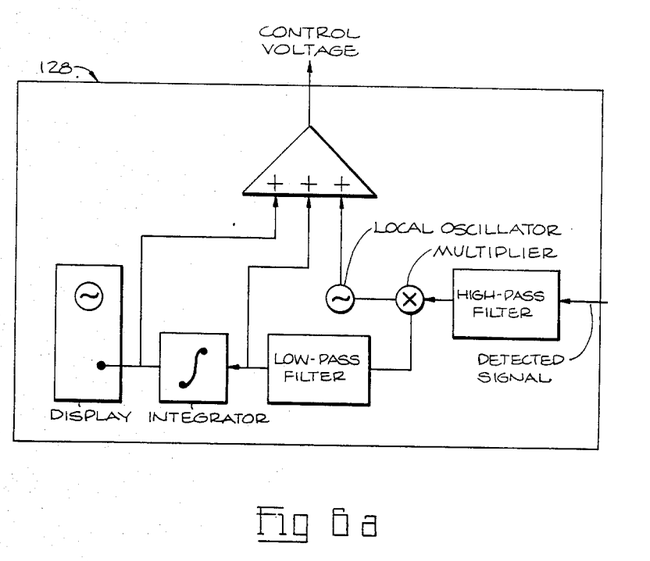
FIG. 6(a) is a schematic drawing showing the electrical circuit diagram for the control circuit used in the embodiment of FIG. 6.

One possible implementation of the control circuit 128 is shown in FIG. 6a. The local oscillator can be operated at a frequency of the order of 30 KHz, while the acoustical signal to be recoverd is usually in the range of 0–5 KHz.

This tunable-cavity detecting method has several advantages with respect to the straightforward intensity-modulation detection. First, the recovered signal corresponds to the optical length variations of the second cavity and not to the intensity fluctuations detected at the end of the fiber, thereby being independent of the random intensity fluctuations of the laser light. Second, the dynamic range of this latter system is not limited, as is the intensity-modulation system, to phase variations much smaller than $2\pi$.

Figure 7:
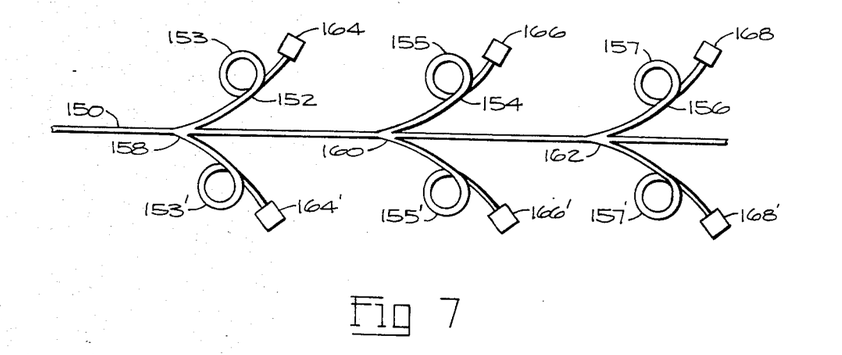
FIG. 7 is also a sketch to show schematically a hydrophone line array encompassed by this invention.

The description above has shown how an isotropic optical fiber hydrophone can be made. Such a hydrophone is envisaged herein as part of a time-multiplexed system using only a single optical fiber, a single source and a single detector, unlike prior art systems which require a plurality of such elements. FIG. 7 herein shows schematically a hydrophone line array as contemplated by this invention. Thus, a single optical fiber 150 is trailed/dragged behind a surface vessel. The fiber 150 is periodically coupled to a plurality of paired probing sensors 152, 154 and 156. In this instance each sensor 152, 154 and 156 is made of two short branches 153,153', 155,155', 157,157' of optical fiber coupled at 158, 160 and 162 to the fiber 150. Each coupler 158, 160 and 162 is a directional tee-coupler, and each branch 153,153', 155,155', 157,157' is terminated with a total reflector 164,164', 166,166' 168,168'.

In operation, a portion of the beam of light from the source on board the vessel is coupled into both fibers of each sensor. That light beam is reflected back by the total reflectors with a phase which depends on the sensor configuration, such as one of those shown in FIGS. 3(a), 3(b), or FIG. 3(c). In practice, the reflectivity of each branch 153,153', 155,155', 157,157' depends on the degree of coupling, and typically is a small fraction of unity.

Each of the sensors 152, 154, 156 reflects back an optical beam which can be time-separated from the adjacent ones if a sufficiently short laser pulse is used as the optical source. High power pulses with pulse lengths in the range of 100 nsec or less are easily obtained from many commercial pulsed lasers. A similar apparatus is used in Time-Domain Reflectometry, where a pulse is inroduced in a long fiber, and the reflected radar-like signal contains a number of peaks corresponding to the discontinuities along the fiber.

As a specific example, let us suppose that the total fiber optical length between two sensors, such as the optical length between 158 and 160 in FIG. 7, is 30 m. Note that the physical distance between two sensors could be in the range of 15–20 m, depending on the refractive index of the fiber and the array geometry. If the optical pulse length is 100 nsec, the reflected signal will have the shape shown in FIG. 8, with each pulse corresponding to a reflection from one of the probing sensors 152, 154 or 156. The amplitude of each pulse depends first upon a number of parameters independent of the acoustical pressure. These parameters are the intrinsic loss along the fiber, the reflectivity of each fiber constituting one sensor, and the number of sensors encountered along the fiber before reaching the probing sensor under consideration. If the intrinsic fiber loss is neglected, the optimum value for the reflectivity would be $\frac{1}{2}N$ for each fiber in the first sensor, where N is the number of sensors, and gradually more for the other ones, up to a value of 1 for the last reflector. This would assure an equal reflected intensity from every sensor and that all the light injected would be returned back.

Figure 8:
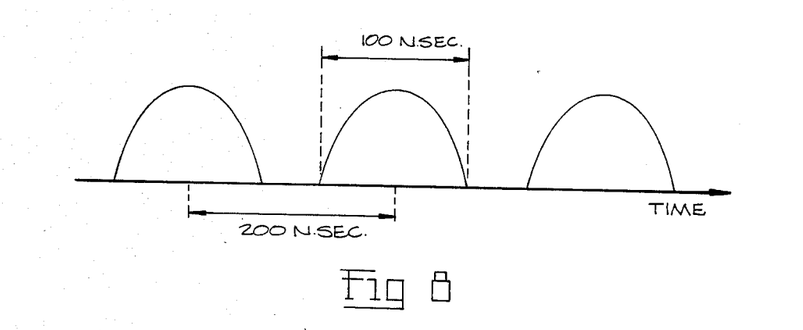
FIG. 8 is a graphical representation of the reflected signal, time separated from adjacent ones derived from the configuration of FIG. 7 using a short laser pulse as the source for the optical signal.

Now consider the coherent superposition of the pair of pulses reflected at each sensor. We understand that the amplitude of each pulse depends on the phase difference of the two pulses, and then on the acoustical pressure in that region at that moment. By separately recording the amplitude of each pulse one can monitor the acoustic pressure along the line. If the fiber pitcal length is 1 km, the response to each pulse would be about 7 $\mu$sec. This allows repetition rates up to 100 kHz, which provides a satisfactory sampling rate for acoustic waves up to 50 kHz.

This principle is by no means limited to a linear array, but is also applicable to implement a two-dimensional antenna.

Figure 9:
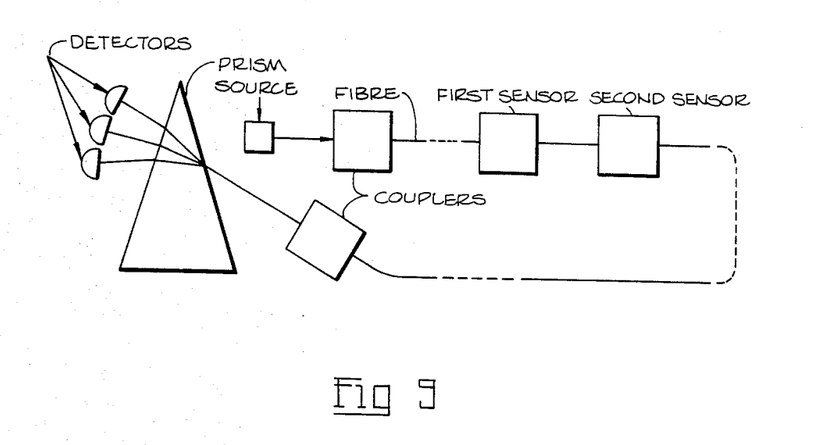
FIG. 9 is a schematic drawing to illustrate another embodiment of a hydrophone system according to this invention, and in which colour multi-plexing is used.

A second multiplexing scheme which is possible with the kind of hydrophones previously described is shown in FIG. 9. A broad-band source emits light which is coupled into the fiber through a coupler. The fiber contains a number of sensors each of which is in the form shown at 18 in FIG. 1. The two reflectors delimiting each sensor are partially reflecting in a limited range of the optical frequencies and totally transparent at other frequencies, such as the reflectors obtained by exposing the fiber to a monochromatic standing wave pattern as described previously. Each frequency component which is separately detected at the end of the fiber by means of a prism, contains information about the acoustical pressure sensed by a specific sensor.

The foregoing has described the preferred, and some other, embodiments encompassed by this invention. The modifications suggested, as well as those apparent to ones skilled in this art, are envisaged to be encompassed by this invention as defined in the claims below.

The embodiments of the invention in which an exclusive property or privilege is claimed are defined as follows:

1. An optical fiber hydrophone system adapted to process variations in local acoustical pressure in a fluid body and provide an identifiable output signal, comprising:
   signal source and detecting means for providing an optical signal in a selected form, and for detecting and extracting said indentifiable output signal;
   a single optical fiber connected at one end to said source and detecting means and operable for conducting optical signals from said source and to said detecting means;
   a sensing means in said optical fiber remote from said source and detecting means, said sensing means being adapted for immersion in said body and including two optical reflector means incorporated into said fiber and spaced one from the other by a predetermined length of said optical fiber, at least one of said reflector means being partially reflective and partially transmissive, said variations in acoustical pressure incident on said sensing portion causing a change in said predetermined length thereof and thus a phase and intensity modulation in the portion of said optical signal reflected back and forth between said two optical reflector means and,
   means connected to said source and detecting means for processing the intensity modulated optical signal transmitted back to said source and detecting means in said optical fiber for extraction therefrom of said identifiable output signal.

2. The optical fiber hydrophone system defined in claim 1, wherein said single optical fiber is provided with at least one terminal branch in the form of a section of a second optical fiber, the two fibers being optically coupled together so as to share said optical signal of selected form, the second optical fiber also containing reflector means to provide a reflected optical signal, mechanical means being provided so that the two fibers are subject to different changes in length in response to the variations in acoustical pressure incident on said sensing portion.

3. The optical fiber hydrophone system defined in claim 1 or 2 wherein each said reflector means is in the form of one of a microscopic taper in the optical fiber, a low quality fiber connector whose reflectivity depends on misalignment of the ends of the optical fibers being connected together and with the refractive index of a matching liquid used in said connector, or a periodic disturbance generated through exposure to an optical standing wave.

4. The optical fiber hydrophone system defined in claim 1 wherein a multiplicity of sensing portions are provided, each sensing portion being spaced from adjacent sensing portions by a predetermined length of said optical fiber.

5. The optical fiber hydrophone system defined in claim 1 wherein a multiplicity of sensing portions are provided, each sensing portion being spaced from adjacent sensing portions by a preselected length of said optical fiber, each sensing portion comprising two terminal branches of optical fiber with a fiber connector incorporated into each extremity of the terminal branches, said branches being separated one from another over a major portion of their length by a mechanically deformable material deformable in response to said variations in acoustical pressure incident thereon, deformation of said material causing said modulation in the reflected signal.

6. The hydrophone system defined in claim 1, or 2, wherein said optical fiber has a multi-branch terminal portion and one of said reflector means is incorporated into an extremity of each branch, said branches having different coefficients of shrinkage, the variations in acoustical pressure incident thereon causing variations in said predetermined length of fiber to modulate the intensity of the resultant reflected optical signal transmitted back to said source means thereby to produce said identifiable output signal.

7. The optical fiber hydrophone system defined in claim 1, wherein said single optical fiber includes two sections, a first section, in use, being disposable underwater with said sensing portion defining a first optical cavity, the second section of the optical fiber typically being located aboard a vessel, and including a second optical cavity therein delimited by optical reflector means; said first and second optical cavities having lengths of said optical fiber therein that are in predetermined relation to one another, whereby said variations in acoustical pressure cause proportional variations in the predetermined length of the sensing portion on which it is incident, this causing intensity modulation of the reflected signal from the first optical cavity and enabling said detector means to extract said identifiable output signal from the intensity modulations.

8. The optical fiber hydrophone system defined in claim 7, wherein said second optical cavity is electronically tunable.

9. The optical fiber hydrophone system defined in claim 8, wherein said second optical cavity comprises a length of said optical fiber wound about a piezoelectric element, whereby a small tuning voltage applied across the piezoelectric element controls the length of said second optical cavity.

10. The optical fiber hydrophone system defined in claim 9, wherein a servo-control circuit is provided for applying said tuning voltage to the piezoelectric element, whereby variations made to said tuning voltage to maintain said cavities tuned, correspond to the modulations in the reflected signal caused by variations in the length of said first optical cavity, as created by the variations in acoustical pressure incident thereon, said variations to the tuning voltage providing said identifiable output signal.

11. The optical fiber hydrophone system defined in claim 1, wherein a multiplicity of sensing portions is provided and said optical signal is a series of time-separated optical pulses; each sensing portion having two short terminal branches of optical fiber optically coupled to said single optical fiber by a directional tee-coupler, each terminal branch terminating with a total reflector whereby a fraction of the optical signal of said time-separated pulses is coupled into each terminal branch, with the modulated reflected signals from those sensing portions on which said variations in acoustical pressure are incident also being time-separated to enable extraction of the identifiable output signal.

12. The optical fiber hydrophone system defined in claim 1, wherein a multiplicity of sensors are provided and each sensor selects a narrow optical frequency band; the various frequency bands being separately detected at the end of the fiber by a dispersive element such as a prism.

13. The optical fiber hydrophone defined in claim 5, 11 or 12 wherein the sensing portions are provided in a plurality of planes each of which contains an underwater section of said single optical fiber.

14. The optical fiber hydrophone system defined in claim 5, or 12 wherein the sensing portions form a two dimensional array.

15. An optical fiber hydrophone system adapted to process variations in local acoustical pressure in a fluid body and provide an identifiable output signal, comprising:
signal source and detecting means for providing an optical signal in a selected form, and for detecting and extracting said identifiable output signal;
a single optical fiber connected at one end to said source and detecting means and operable for conducting optical signals from said source and to said detecting means;
a sensing means in said optical fiber remote from said source and detecting means, said sensing means being adapted for immersion in said fluid body and including a predetermined length of said optical fiber; two optical reflector means incorporated into said fiber and spaced one from the other by said predetermined length of said optical fiber, at least one of said reflector means being partially reflective; and anisotropical means secured to the predetermined length of fiber for stressing the predetermined length of fiber anisotropically in response to variations in acoustical pressure incident on said sensing means, thus causing a change in the dimensions of said predetermined length of fiber and a phase and intensity modulation in the portion said optical signal reflected back and forth between said optical reflector means and
means connected to said source and detecting means for processing the intensity modulated signal transmitted back to said source and detecting means in said optical fiber for extraction therefrom of said identifiable output signal.

16. An optical fiber hydrophone system defined in claim 15, wherein said predetermined length of said optical fiber is in the form a coil and said anisotropical means comprise a hollow end-capped cylinder in which the coil is embedded.

17. An optical fiber hydrophone system defined in claim 15 wherein the anisotropical means comprise a body of an anisotropically deformable material.

* * * * *